Oct. 6, 1964  H. E. STECK  3,151,683
CULTIVATOR ATTACHMENT FOR ROTARY HOE
Filed Jan. 25, 1962
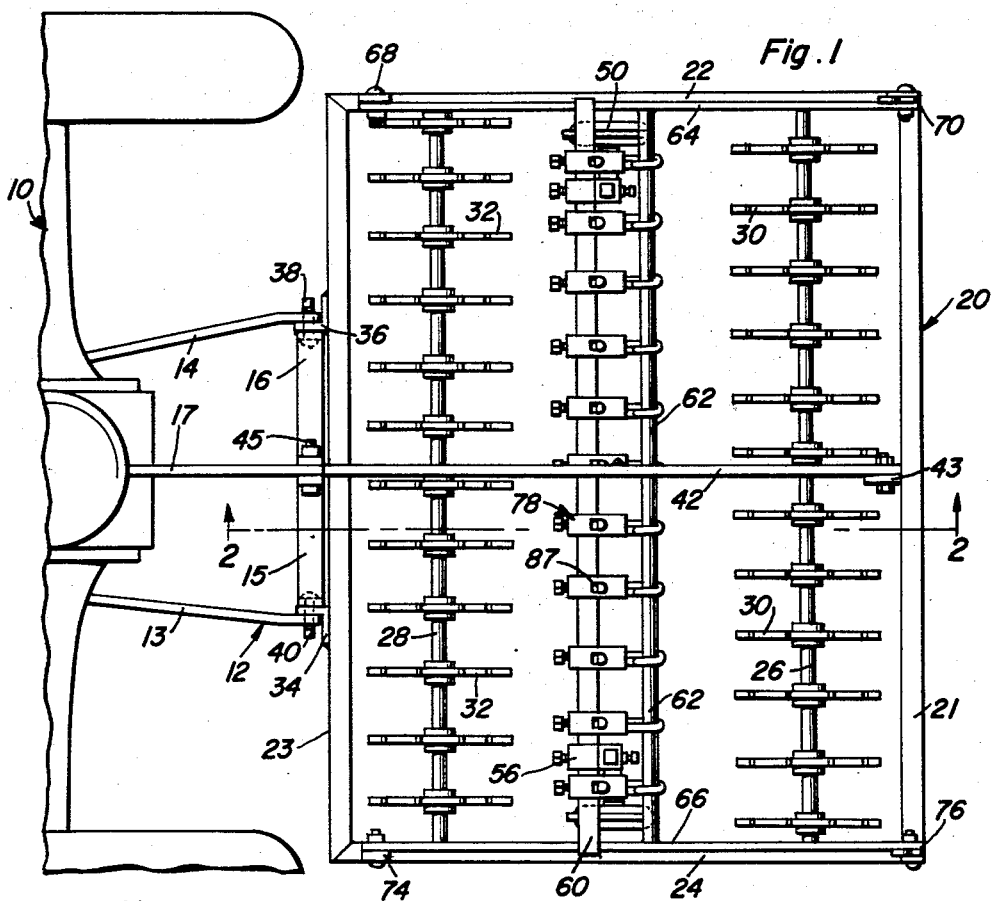
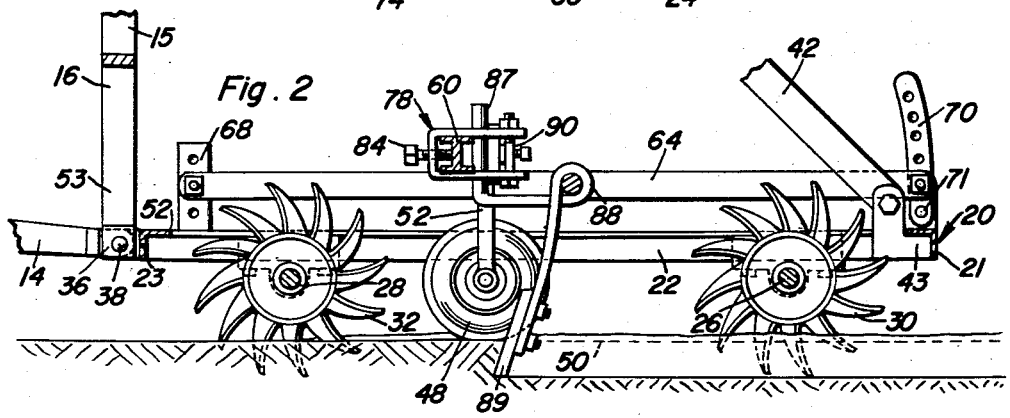
Homer E. Steck
INVENTOR.

United States Patent Office 3,151,683
Patented Oct. 6, 1964

3,151,683
CULTIVATOR ATTACHMENT FOR ROTARY HOE
Homer E. Steck, 115 E. Finley St., Upper Sandusky, Ohio
Filed Jan. 25, 1962, Ser. No. 168,751
1 Claim. (Cl. 172—148)

This invention relates to agricultural implements, and particularly to a combined cultivator and plow, the latter being in the form of an attachment for the cultivator.

An object of this invention is to provide a disk or other type of cultivator with a plow attachment, the latter being carried by the cultivator frame for rapid adjustment both as to depth of reach and with respect to the cultivator tools.

A further object of this invention is to provide an attachment for a cultivator which destroys weeds and better pulverizes the soil as the cultivator is drawn through a field by a tractor or other traction device.

A further object of this invention is to provide a combined cultivator and plow which is fabricated in a simple and practical manner, that is, utilizing a cultivator frame as a base on which to mount a plow beam, the latter being vertically adjustable with respect to the frame, and the plow shares being not only vertically adjustable but also laterally adjustable with respect to the cultivator frame in order to yield the optimum working combination for cultivating the soil.

A further object of this invention is to provide a combined cultivator and plow as described above, with depth gauge wheels adapted to be adjustably supported from the plow beam.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the plow attachment connected with a cultivator and arranged to be drawn through a field by a tractor, fragmentarily illustrated;

FIGURE 2 is a transverse sectional view taken on the plane of line 2—2 and in the direction of the arrows; and FIGURE 3 is a perspective view of a C-clamp used to hold the plow shares in longitudinally adjusted position along the plow beam.

In the accompanying drawings, there is a tractor 10 fragmentarily illustrated, the tractor being of completely standard construction and including an A-frame type drawbar 12 with links 13 and 14 having A-frame members 15 and 16 connected thereto. At the upper end of the A-frame members 15 and 16, there is a bar 17 operatively connected with the tractor.

A cultivator 20 is connected with the tractor and comprises a rectangular frame having sides 21, 22, 23 and 24, respectively, which are welded or otherwise rigidly secured together. Transverse axles 26 and 28 extend across the sides 22 and 24 and are mounted in bearings. These axles have a plurality of cultivators in gangs 30 and 32 thereon. Although only one type of cultivator is shown, it is understood that others, for example, the disk type, may be substituted as found desirable in view of the job to be performed. The cultivators of the gang 32 and the gang 30 are staggered with respect to each other so that they do not track.

Means attaching the frame to the tractor are provided, and they consist of a pair of brackets 34 and 36 fixed to the side 23 of the frame and connected by bolts 38 and 40 to the drawbar at the junction of members 13 with frame member 15 and member 14 with the A-frame member 16. Control lever 42 is pivoted at one end on bracket 43, the latter being welded or otherwise rigidly fixed to the side 21 of the frame. The opposite end of the control lever 42 is pivoted to the upper ends of A-frame members 15 and 16 by bolts 45 and connected to link 17.

Depth gauge wheels 48 and 50 are secured to the ends of a plow beam 60 which is mounted on a pair of support members 64 and 66 and extends transversely across the cultivator frame. A tool bar 62 is arranged parallel to the plow beam 60 and is also secured to the opposed plow support members 64 and 66. These latter members are vertically adjustable in that their ends are apertured to accommodate bolts. The bolts at the ends of member 64 are releasably secured in selected apertures of upstanding brackets 68 and 70, the bracket 68 being fixed to frame side 22 and the bracket 70 being pivoted, as by pin 71, to the same frame side 22. Plow support member 66 is similarly secured to bracket 74 and bracket 76 thereby enabling the members 64 and 66 to pivot about a vertically adjustable axis.

A plurality of C-clamps 78 are mounted on the plow beam 60. Each C-clamp has a pair of sides 79 and 80 connected by a plate 82 at one pair of ends thereof. This plate is apertured and tapped in order to accommodate a setscrew 84 whose end is brought to bear against plow beam 60 in order to adjust the position of the C-clamp longitudinally on the plow beam 60. The depth wheels 48 and 50 each have a shank 52 adjustably mounted on plow beam 60 by virtue of clamps 56 which are the same in construction as the clamps 78.

Aligned non-circular openings 85 and 86 are formed in the sides 79 and 80 of the C-clamp 78 in order to accommodate the non-circular, similarly shaped shanks 87. This shank has an eye 88 intermediate its ends, this eye being on tool bar 72. The lower end of the shank 87 has a plow share 89 mounted thereon. Various types of plow shares 89 or other digging tools may be attached to the outer ends of the shanks 87 depending upon the prerogative of the user of the device. In order to aid in holding the C-clamps 78 fixed in place, once they are adjusted, bolt 90 passes through aligned openings in the sides 79 and 80 squeezing the C-clamp tightly on the plow beam 60.

In operation, the clamps 78 are adjusted so that they will support their earth working tools in position for maximum weed destruction and soil pulverizing. This will usually be a location between the tracks formed by the gangs of cultivators 30 and 32.

The device is attached to a tractor, as shown in the drawing, and the depth adjusted by adjusting the position of the shank 52 in relation to beam 60 thereby setting wheels 48 and 50 in the desired position with respect to the cultivator frame.

Then, the cultivator is drawn through the field with the gangs of cultivator disks 30 and 32 working the soil, and the plow attachment thereon furthering the operation by plowing the soil between the first gang 32 and the second gang 30. The relative position of the plow attachment with respect to the cultivators is adjustable by relocating the plow supporting members 64 and 66 with respect to the cultivator frame.

This tool may be constructed in various sizes such as for 2, 4, or 6 rows. Also, the structure is easily attached to various types of hydraulic lifts normally employed on farm tractors.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A cultivator assembly comprising a generally rectangular rigid frame, a forward gang of cultivator members rotatably supported below said frame, a rearward gang of cultivator members rotatably supported below said frame, a pair of support members extending longitudinally of and above the sides of said frame, means pivotally and vertically adjustably connecting the forward ends of the support members to the frame, means adjustably connecting the rear ends of the support members to the frame for arcuate swinging movement about vertically adjustable axes at the forward end of the support members, a transverse plow beam extending between the central portions of the supporting members and orientated intermediate the forward and rearward cultivator members, depth gauge wheels for said cultivator, said depth gauge wheels being located between the forward and rearward cultivator members, means adjustably securing the depth gauge wheels to the plow beam, a plurality of tool shanks, each tool shank having a plow at the bottom end thereof, said plows being located intermediate the forward and rearward cultivator members, each tool shank having a forwardly extending offset upper end and an upwardly extending terminal upper end extending across the plow beam, means adjustably and clampingly securing the tool shanks to the plow beam for both longitudinal adjustment along the plow beam and vertical adjustment in relation thereto, each tool shank having a loop formed therein at the rearward end of the offset portion, and a rigid bar extending through the loops and connected to the support members in rearwardly spaced and downwardly spaced relation to the plow beam whereby the orientation of the upper ends of the tool shank in relation to the plow beam will cause the disposition of the plows on the lower end of the tool shanks to be angularly and vertically adjusted.

References Cited in the file of this patent

UNITED STATES PATENTS

| | | |
|---|---|---|
| 387,412 | Graetzel et al. | Aug. 7, 1888 |
| 675,924 | Blaine | June 11, 1901 |
| 1,155,192 | Anderson | Sept. 28, 1915 |
| 2,261,666 | Selhorst | Nov. 4, 1941 |
| 2,562,486 | Denning | July 31, 1951 |
| 2,607,176 | McVicar | Aug. 19, 1952 |
| 3,006,422 | Mighell | Oct. 31, 1961 |